(12) United States Patent
Nakano et al.

(10) Patent No.: US 6,598,528 B2
(45) Date of Patent: Jul. 29, 2003

(54) SAFETY APPARATUS FOR ROTARY PRESS

(75) Inventors: Takeaki Nakano, Higashikatsushika-gun (JP); Kazunori Takeda, Toride (JP)

(73) Assignee: Komori Corporation, Tokyo (JP)

( * ) Notice: Subject to any disclaimer, the term of this patent is extended or adjusted under 35 U.S.C. 154(b) by 0 days.

(21) Appl. No.: 09/855,609

(22) Filed: May 16, 2001

(65) Prior Publication Data

US 2001/0042462 A1 Nov. 22, 2001

(30) Foreign Application Priority Data

May 16, 2000 (JP) ........................................ 2000-142933

(51) Int. Cl.⁷ .............................................. B41F 33/04
(52) U.S. Cl. ........................ 101/484; 101/216; 101/477; 101/483
(58) Field of Search ................................. 101/216, 484, 101/483, 477

(56) References Cited

U.S. PATENT DOCUMENTS

| 4,000,693 A | | 1/1977 | Kaiser et al. | |
|---|---|---|---|---|
| 4,276,827 A | | 7/1981 | Johne et al. | |
| 5,142,979 A | * | 9/1992 | Funada et al. | ............... 101/183 |
| 5,235,217 A | * | 8/1993 | Kirton | ..................... 192/129 A |
| 5,574,437 A | | 11/1996 | Schwinn et al. | |
| 5,828,302 A | * | 10/1998 | Tsutsumi et al. | ........... 340/540 |

FOREIGN PATENT DOCUMENTS

| CH | 588 945 | 6/1977 |
|---|---|---|
| DE | 2854672 | 9/1979 |
| EP | 0 978 381 A | 2/2000 |
| JP | 9-174820 A | 7/1997 |

* cited by examiner

*Primary Examiner*—Andrew H. Hirshfeld
*Assistant Examiner*—Jill E. Culler
(74) *Attorney, Agent, or Firm*—Birch, Stewart, Kolasch & Birch, LLP

(57) ABSTRACT

A safety apparatus for a rotary press comprises a detector disposed on a side of a plurality of printing units in order to detect entry of a foreign object between the printing units, the detector consisting of light projecting units and light receiving units; a push button provided on the printing unit and pushed after completion of checking performed before initiation of automatic plate-replacing operation of the printing units; and a controller for starting the automatic plate-replacing operation and detecting operation of the detector when a predetermined time elapses after operation of the button.

7 Claims, 5 Drawing Sheets

SAFETY APPARATUS FOR ROTARY PRESS

The entire disclosure of Japanese Patent Application No. 2000-142933 filed on May 16, 2000, including specification, claims, drawings and summary is incorporated herein by reference in its entirety.

BACKGROUND OF THE INVENTION

1. Field of the Invention

The present invention relates to a safety apparatus for a rotary press equipped with an automatic plate-replacing apparatus or the like.

2. Description of the Related Art

In a rotary press, such as a four-color double-sided simultaneous offset printing press, equipped with an automatic plate-replacing apparatus, plate guides of the plate-replacing apparatus are moved from their OFF positions to ON positions and from the ON positions to the OFF positions during automatic plate-replacing operation. However, such automatic plate-replacing operation is hindered if an obstacle is present in (i.e., if a worker or other person enters) a plate-guide work space between printing units at the time of movement of the plate guides.

Accordingly, if an obstacle is placed in the plate-guide work space before or during the automatic plate replacement, it becomes necessary to promptly prohibit starting the automatic plate replacement or to stop the automatic plate replacement.

In view of the foregoing, conventionally, a detector for detecting entrance of a worker or a like person is disposed for each printing unit as a safety apparatus; and the machine is stopped immediately upon detection of such an entrance.

Since the above-described conventional safety apparatus utilizes a detector disposed for each printing unit and adapted to detect entrance of a worker or a like person, components for constituting a detector and a space for installing them must be provided for each printing unit, resulting in increased size and complexity of the apparatus and increased cost.

SUMMARY OF THE INVENTION

In view of the foregoing, an object of the present invention is to provide a safety apparatus for a rotary press which can simplify the apparatus to thereby reduce cost and which is suitable for multi-color printing machines.

In order to achieve the above object, the present invention provides an improved safety apparatus for a rotary press. The safety apparatus comprises a detector disposed on a side of a plurality of printing units of the rotary press to cover a zone extending from a furthest upstream printing unit to a furthest downstream printing unit and adapted to detect entry of a foreign object into the zone; a switch provided on each printing unit of the rotary press; and control means for starting operation of the printing units in a next step and detecting operation of the detector when a predetermined time elapses after the switch is operated.

In the safety apparatus, the detector may include a light projecting unit and a light receiving unit; and self diagnosis of the light projecting unit and the light receiving unit may be performed when a predetermined time elapses after the switch is operated. In this case, the self diagnosis of the light projecting unit and the light receiving unit may be performed after completion of the operation of the printing units in the next step.

In the safety apparatus, the operation of the printing units in the next step may be plate replacing operation for removing an old plate from a plate cylinder of each of the printing units and for attaching a new plate to the plate cylinder.

In the safety apparatus, the control means may measure time between operation of the first switch and operation of the last switch. When the time is in excess of a preset time, all the switches are reset.

In the safety apparatus, the control means may stop the operation in the next step when the detector detects a foreign object during the operation in the next step.

DESCRIPTION OF THE PREFERRED EMBODIMENT

A safety apparatus for a rotary press according to an embodiment of the present invention will next be described in detail with reference to the drawings.

Figure 1:
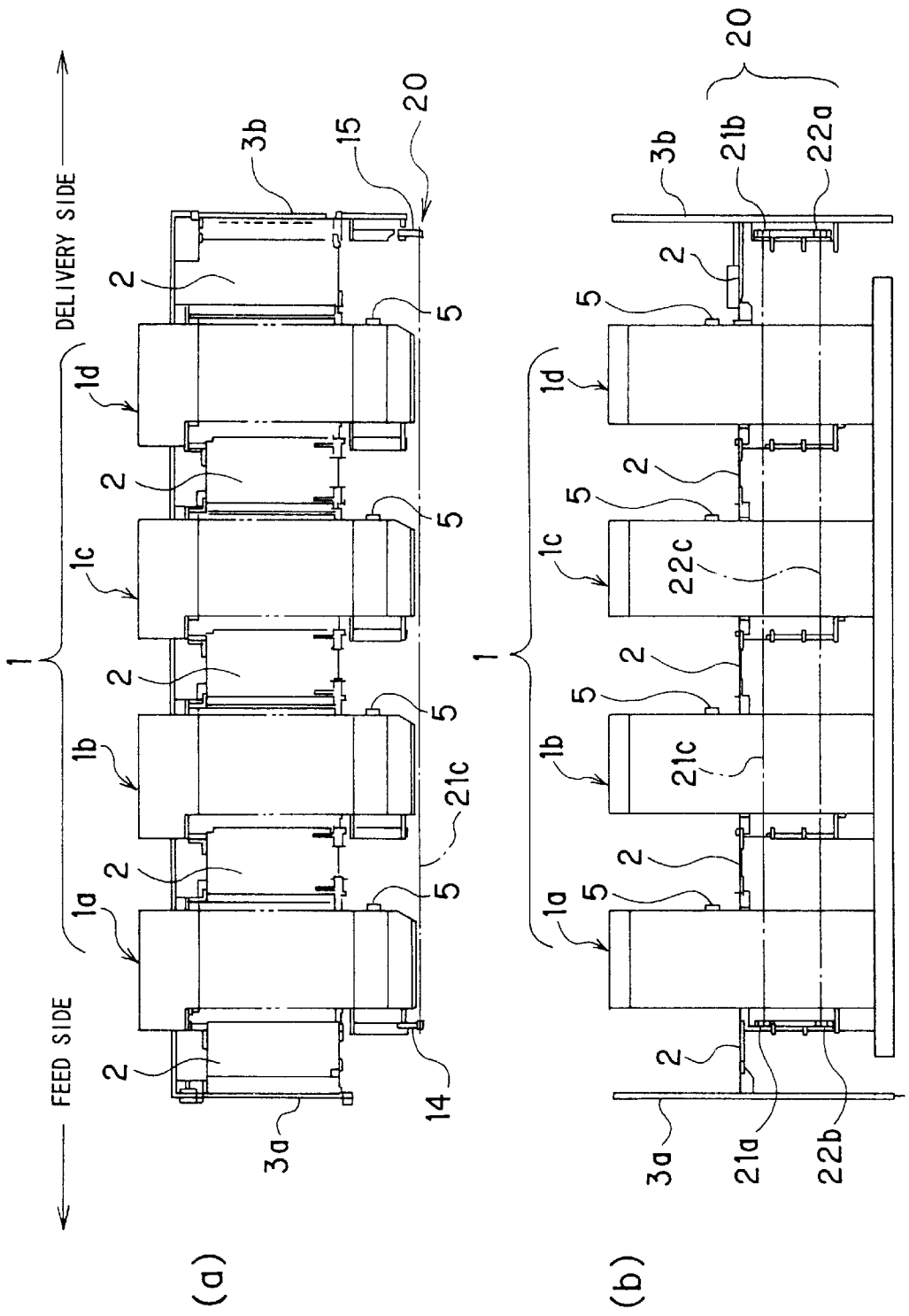
FIG. 1 is two outside views of a four-color double-sided simultaneous offset printing press according to an embodiment of the present invention, wherein (a) is a plan view, and (b) is a side view.
Figure 2:
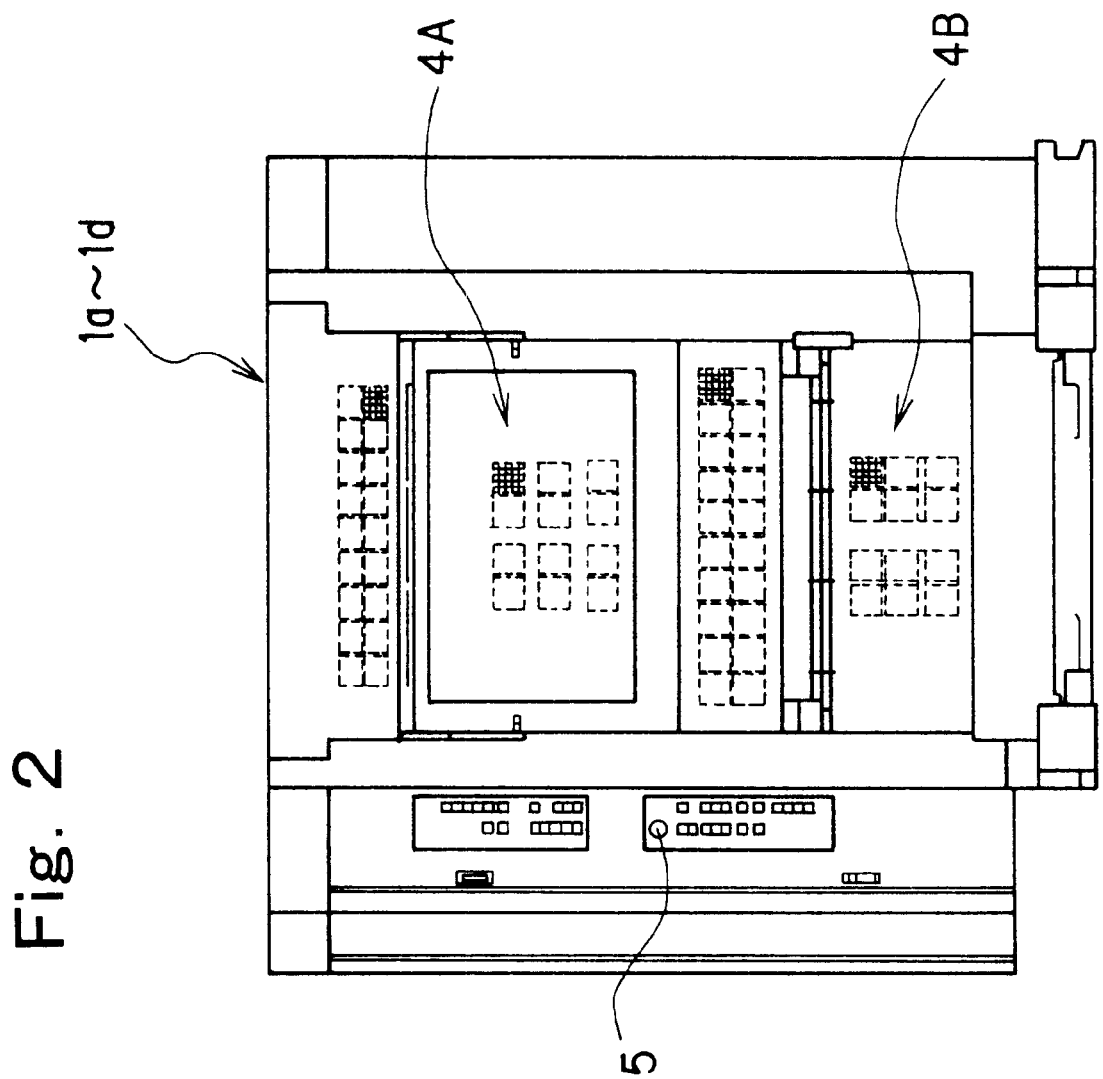
FIG. 2 is a schematic view of a printing unit as viewed from the delivery side.
Figure 3:
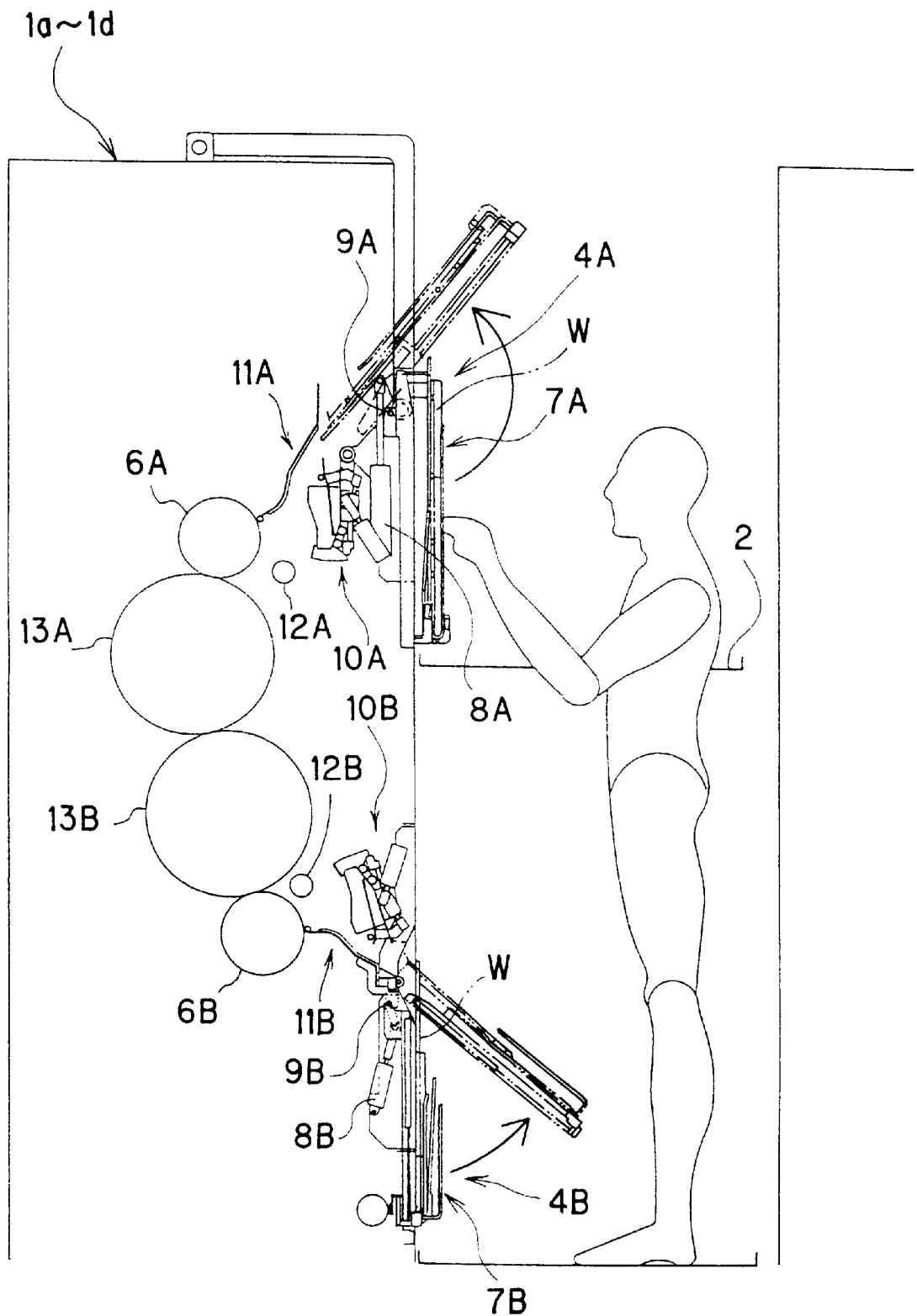
FIG. 3 is a schematic structural view of an automatic plate-replacing apparatus.
Figure 4:
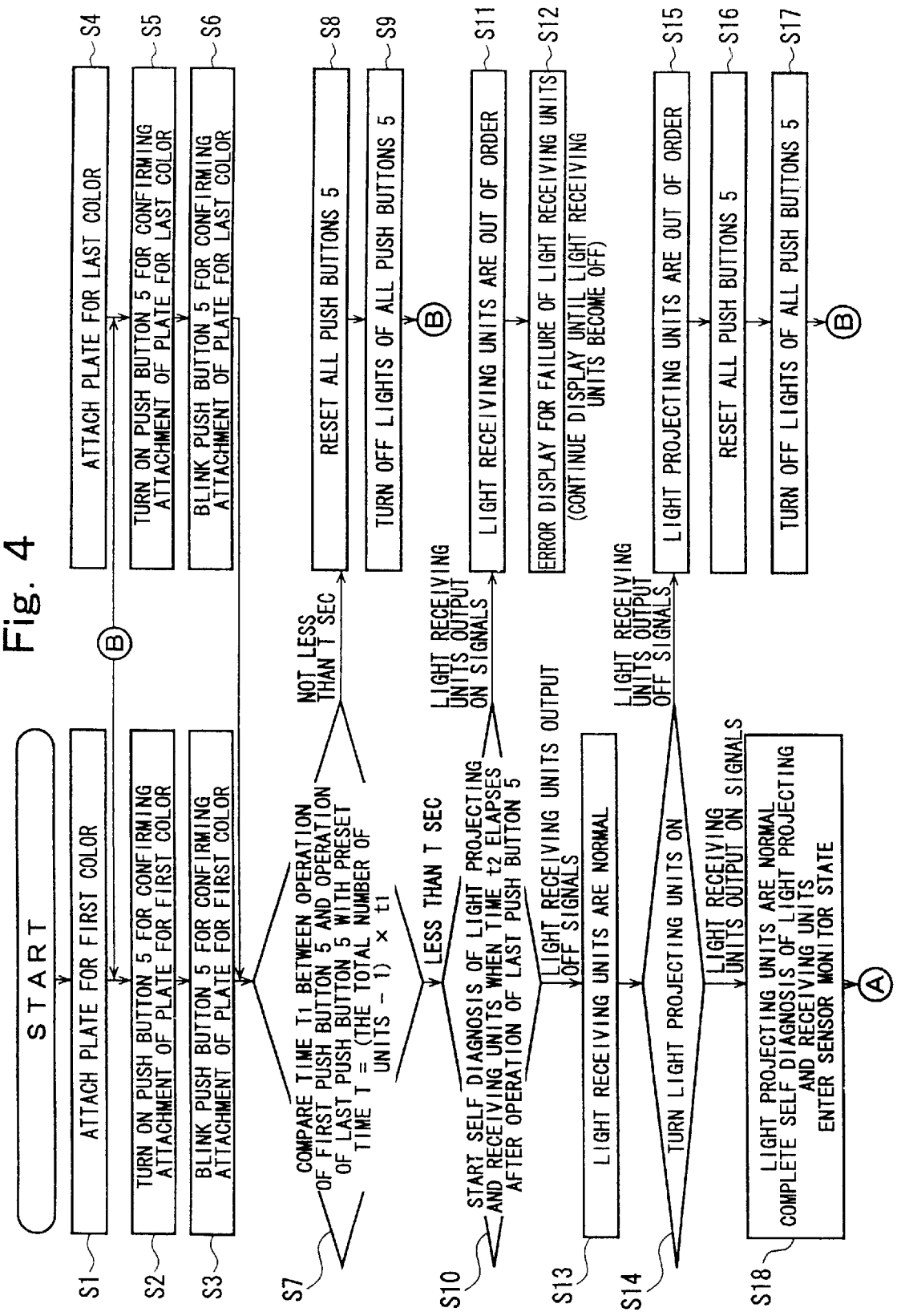
FIG. 4 is a flowchart showing operation of a safety apparatus.
Figure 5:
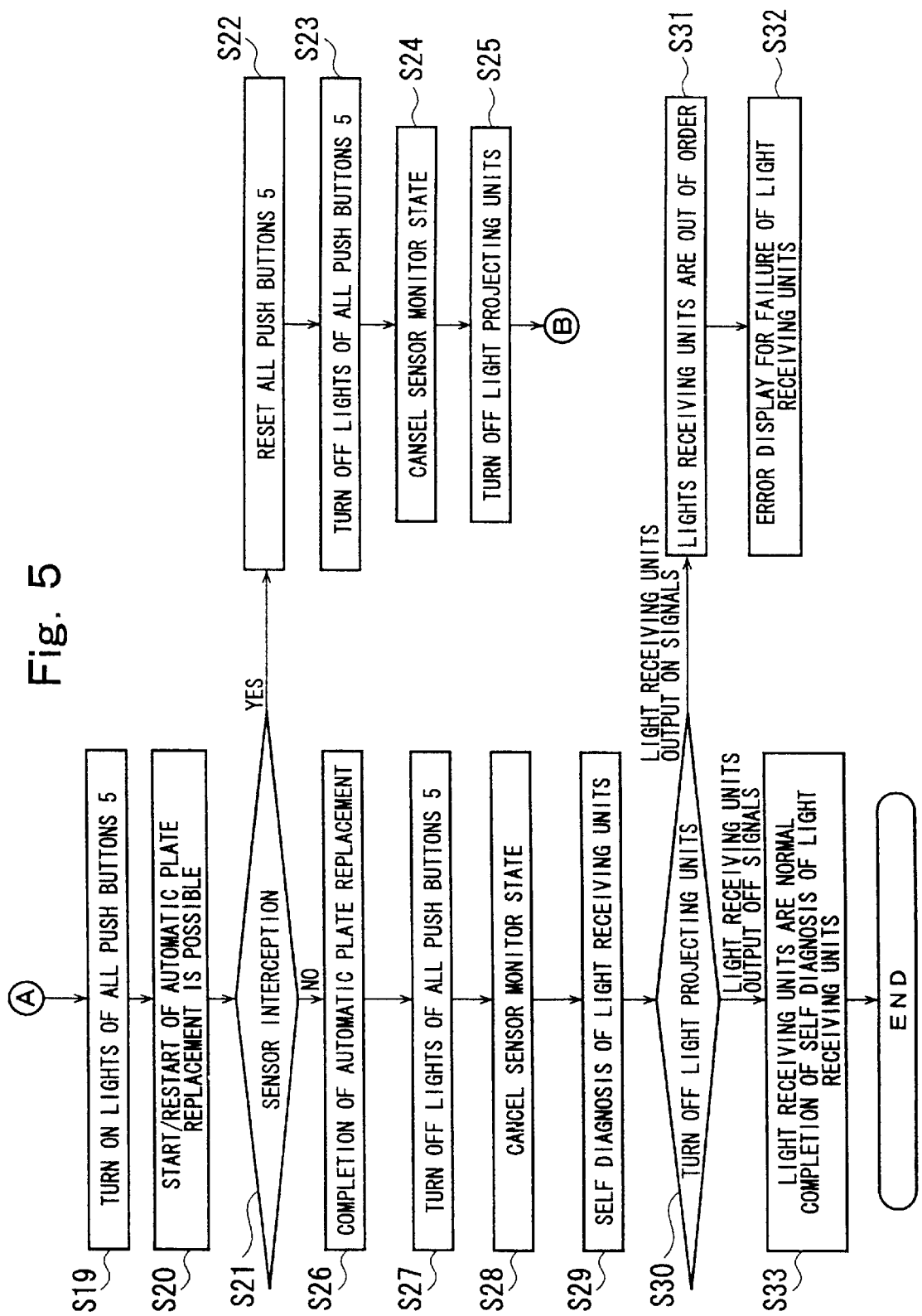
FIG. 5 is a flowchart showing operation of the safety apparatus.

FIG. 1 shows outside views of a four-color double-sided simultaneous offset printing press according to an embodiment of the present invention, wherein (a) is a plan view, and (b) is a side view. FIG. 2 is a schematic view of a printing unit as viewed from the delivery side. FIG. 3 is a schematic structural view of an automatic plate-replacing apparatus. FIGS. 4 and 5 are flowcharts showing operation of a safety apparatus.

As shown in FIG. 1, the four-color double-sided simultaneous offset printing press includes four printing units $1a$ to $1d$; and a step 2 is provided on each of the front and back sides of the printing units $1a$ to $1d$ at a vertically centered position such that the step 2 can be opened and closed selectively from either of the feed or delivery sides. In FIG. 1, reference numerals $3a$ and $3b$ denote auxiliary frames.

Further, as shown in FIG. 2, each of the printing units $1a$ to $1b$ has, on the back face (delivery side) thereof, plate-replacing units 4A and 4B of the automatic plate-replacing apparatus, which will be described later. In addition, a push button 5 for confirming attachment of the plates is disposed on a side of the plate-replacing units 4A and 4B.

As shown in FIG. 3, the plate-replacing unit 4A has a plate guide (plate holding apparatus) 7A for accommodating an old plate removed from a plate cylinder 6A and a new plate W to be attached to the plate cylinder 6A. The plate-replacing unit 4B has a plate guide (plate holding apparatus) 7B for accommodating an old plate removed from a plate cylinder 6B and a new plate W to be attached to the plate cylinder 6B. At the time of plate replacement, the plate guides 7A and 7B are rotated (swung) counterclockwise about respective support shafts 9A and 9B, by means of an extension/contraction operation of respective actuators 8A and 8B, from their retreat positions (OFF positions) indicated by solid lines in FIG. 3 to their work positions (ON positions) indicated by two-dot chain lines in FIG. 3.

In FIG. 3, reference numerals 10A and 10B each denote a first plate guide apparatus; 11A and 11B each denote a second plate guide apparatus; 12A and 12B each denote a plate press roller; and 13A and 13B each denote a rubber cylinder. The applicant of the present invention has filed patent applications for the above-described automatic plate-replacing apparatus, including Japanese Patent Application No. 11-264009.

In the present embodiment, as shown in FIG. 1, a detector 20 consisting of beam sensors such as infrared ray sensors or line sensors is disposed on the operation side of the printing units 1 (on the left side of the printing machine as viewed toward the paper feed side) in order to cover a zone extending from the first printing unit 1a to the delivery-side auxiliary frame 3b. The detector 20 detects entrance of a worker or a like person (a foreign object) into the work spaces of the plate guides 7A and 7B during the above-described plate replacement.

Specifically, a light projecting unit 21a and a light receiving unit 22b of the detector 20 are attached to the front face of the first printing unit 1a via a bracket 14 such that the light projecting unit 21a and the light receiving unit 22b are arranged vertically while being separated from each other by a predetermined distance. A light receiving unit 21b for receiving a light beam 21c from the light projecting unit 21a and a light projecting unit 22a for projecting a light beam 22c toward the light receiving unit 22b are attached to the front face of the auxiliary frame 3b via a bracket 15 such that the light receiving unit 21b and the light projecting unit 22a are arranged vertically while being separated from each other by a predetermined distance.

Detection signals from the detector 20 are input to an unillustrated controller serving as a control means. On the basis of the input signals, the controller controls various devices in accordance with the flowcharts shown in FIGS. 4 and 5.

Next, control operation of the controller (safety apparatus) having the above-described configuration will be described with reference to the flowcharts shown in FIGS. 4 and 5.

First, in steps S1 to S6, before start of an automatic plate-replacing operation, an operator sets new plates W onto the plate guides 7A and 7B of the printing unit 1a for a first color and then checks whether an obstacle (a worker) is present in the work spaces of the plate guides 7A and 7B. When any obstacle is present, the operator removes the obstacle. When no obstacle is present, the operator pushes the push button 5 for confirming attachment of the plates. As a result, the push button 5 starts blinking. The operator repeats this work for the printing unit 1b to the printing unit 1d for the last color.

In subsequent step S7, time $T_1$ between operation of the first push button 5 and operation of the last push button 5 is measured, and is compared with a preset time T=(the total number of units−1)×$t_1$. When the time $T_1$ is equal to or greater than the preset time T, in steps S8 to S9, all the push buttons 5 are reset, so that their lights are turned off. This operation minimizes the possibility of an obstacle being placed in a checked printing unit. The preset time T can be changed freely.

When the time $T_1$ is less than the preset time T, in step S10, self diagnosis of the light projecting and receiving units of the detector 20 is started when time $t_2$ (seconds) has elapsed after operation of the last push button 5. Specifically, when the light receiving unit 21b or 22b outputs an ON signal, in steps S11 and S12, it is judged whether one of the light receiving unit 21b or 22b is out of order, and an error display is continued until each of the light receiving units 21b and 22b outputs an OFF signal.

When each of the light receiving units 21b and 22b outputs an OFF signal, in step S13, it is judged that both the light receiving units 21b and 22b are normal, and in subsequent step S14, the light projecting units 21a and 22b are turned on for diagnosis.

When in step S14 one of the light receiving units 21b and 22b outputs an OFF signal, in steps S15 to S17, it is judged that the light projecting unit 21a or 22a is out of order, and all the push buttons 5 are reset, so that their lights are turned off.

In contrast, when each of the light receiving units 21b and 22b outputs an ON signal, in step 18, it is judged that both the light projecting units 21a and 22a are normal. In this case, the self diagnosis of the light projecting and receiving units is completed, and the controller enters a sensor monitor state. Through performance of the self diagnosis of the light projecting and receiving units, erroneous detection due to failure of the light projecting and receiving units can be avoided, and thus the reliability of the apparatus is enhanced.

In subsequent step S19, all the lights of the push buttons 5 are turned on, and in step S20, an automatic plate-replacing operation is started (or re-started).

In a subsequent step S21, it is judged whether sensor interception occurs (whether either the beam 21c or 22c of the detector 20 is intercepted by an obstacle). When sensor interception occurs, in step S22 to S25, all the push buttons 5 are reset, so that their lights are turned off. Subsequently, the sensor monitor state is cancelled, and the light projecting units 21a and 22a are turned off. Needless to say, in this case, the automatic plate-replacing operation is stopped in order to secure safety.

By contrast, when sensor interception does not occur, in step S26 to S28, all the lights of the push buttons 5 are turned off after completion of the automatic plate-replacing operation, and the sensor monitor state is cancelled. Subsequently, in step S29, self diagnosis of the light receiving units 21b and 22b is performed.

Specifically, when in step S30 the light receiving unit 21b or 22b outputs an ON signal despite the light projecting units 21a and 22a being OFF, in steps S31 and S32, it is judged that one of the light receiving units 21b or 22b is out of order, and an error display is continued until each of the light receiving units 21b and 22b outputs an OFF signal.

By contrast, when each of the light receiving units 21b and 22b outputs an OFF signal, in step S33, it is judged that both the light receiving units 21b and 22b are normal, and the self diagnosis of the light receiving units 21b and 22b is completed. In this manner, preparation for the next automatic plate-replacing operation is performed.

As described above, the safety apparatus is configured in such a manner that the beams 21c and 22c of the detector 20 travel along the paper feed direction of the printing machine across the plurality of printing units 1a to 1d. Therefore, unlike the case of the conventional apparatus, providing a detector for each printing unit is unnecessary, so that the apparatus can be simplified to thereby reduce cost.

The present invention is not limited to the above-described embodiment, and may be modified in various manners without departing from the scope of the present invention. For example, the safety apparatus of the present invention can be applied to a rotary press which differs in the number of printing units and to a rotary press equipped with no automatic plate-replacing apparatus.

As described above, the safety apparatus of the present invention comprises a detector disposed on a side of a plurality of printing units of the rotary press to cover a zone extending from a furthest upstream printing unit to a furthest downstream printing unit and adapted to detect entry of a foreign object into the zone; a switch provided on each printing unit of the rotary press; and control means for starting operation of the printing units in a next step and detecting operation of the detector when a predetermined time elapses after the switch is operated. Therefore, it becomes possible to provide a safety apparatus which is suitable for a multi-color printing machine and which can simplify the apparatus, to thereby reduce cost.

Further, in the safety apparatus of the present invention, the detector comprises a light projecting unit and a light receiving unit; and self diagnosis of the light projecting unit and the light receiving unit is performed when a predetermined time elapses after operation of the switch. Therefore, the reliability of the apparatus can be improved further.

What is claimed is:

1. A safety apparatus for a rotary press having a plurality of printing units, comprising:
   a detector disposed on a side of said rotary press to cover a zone including each of said plurality of printing units and adapted to detect entry of a foreign object into said zone;
   a switch provided on each printing unit of said printing press; and
   control means for starting operation of said printing units and detecting operation of said detector when a predetermined time elapses after all of said switches are operated sequentially.

2. A safety apparatus for a rotary printing press according to claim 1, wherein said detector includes a light projecting unit and a light receiving unit; and self diagnosis of said light projecting unit and said light receiving unit is performed when a second predetermined time elapses after all of said switches are operated.

3. A safety apparatus for a rotary press according to claim 1, wherein the operation of said printing units is a plate replacing operation for removing an old plate from a plate cylinder of each of said printing units and for attaching a new plate to the plate cylinder.

4. A safety apparatus for a rotary press according to claim 1, wherein said control means stops the operation of the printing units when said detector detects a foreign object.

5. A safety apparatus for a printing press according to claim 1, wherein the operation of said printing units is begun after said detecting operation is commenced.

6. A safety apparatus for a rotary printing press having a plurality of printing units, comprising:
   a detector disposed on a side of said rotary press to cover a zone including each of said plurality of printing units and adapted to detect entry of a foreign object into said zone, said detector including a light projecting unit and a light receiving unit;
   a switch provided on each printing unit of said printing press; and
   control means for starting operation of said printing units and detecting operation of said detector when a predetermined time elapses after all of said switches are operated sequentially;
   a first self diagnosis of said light projecting unit and said light receiving unit being performed when a second predetermined time elapses after all of said switches are operated, and a second self diagnosis of said light projecting unit and said light receiving unit is performed after the completion of the operation of said printing units.

7. A safety apparatus for a rotary press having a plurality of printing units, comprising:
   a detector disposed on a side of said rotary press to cover a zone including each of said plurality of printing units and adapted to detect entry of a foreign object into said zone, said detector including a light projecting unit and a light receiving unit;
   a switch provided on each printing unit of said printing press; and
   control means for starting operation of said printing units and detecting operation of said detector when a predetermined time elapses after all of said switches are operated sequentially, said control means measuring time between operation of the first switch and operation of the last switch, and when the time is in excess of a preset time, all of the switches are reset.

* * * * *